United States Patent [19]

Inose et al.

[11] 3,862,364

[45] Jan. 21, 1975

[54] TRANSMITTING-AND-RECEIVING APPARATUS FOR PERFORMING DATA TRANSMISSION THROUGH COMMON BUS

[75] Inventors: Fumiyuki Inose, Kokubunji; Hideo Nakamura, Hachioji; Kazuo Takasugi, Higashiyamato, all of Japan

[73] Assignee: Hitachi, Ltd., Tokyo, Japan

[22] Filed: Dec. 15, 1972

[21] Appl. No.: 315,551

[30] Foreign Application Priority Data

Dec. 15, 1971 Japan .............................. 46-101002

[52] U.S. Cl. .............................. 178/59, 307/88 MP

[51] Int. Cl. .............................................. H04l 5/14

[58] Field of Search ............ 178/58 R, 58 A, 59, 60; 179/15 AM, 15 AL; 307/88 MP; 340/196, 199; 336/229

[56] References Cited

UNITED STATES PATENTS

| | | | |
|---|---|---|---|
| 3,112,368 | 11/1963 | Schramel | 179/15 AM |
| 3,328,527 | 6/1967 | Miles | 178/58 |
| 3,566,031 | 2/1971 | Carbone | 178/59 |
| 3,730,993 | 5/1973 | Moriyasu | 178/59 |

*Primary Examiner*—David L. Stewart
*Attorney, Agent, or Firm*—Craig & Antonelli

[57] ABSTRACT

In a system wherein a plurality of stations are connected to a common bus, for performing data communication among the respective stations through the common bus, each station having a transmitting-and-receiving apparatus including a circuit for subtracting a signal component generated by its own station from among a signal received through the bus by its own station, whereby a signal of another station is received without being jammed by the transmitted signal of the receiving station.

4 Claims, 7 Drawing Figures

TRANSMITTING-AND-RECEIVING APPARATUS FOR PERFORMING DATA TRANSMISSION THROUGH COMMON BUS

BACKGROUND OF THE INVENTION

1. Field of the Invention

The present invention relates to transmitting-and-receiving apparatus in a bus system data transmission equipment in which a plurality of stations are connected to, and commonly hold a single bus to thereby exchange data among such stations.

2. Description of the Prior Art

In the case of exchanging data among a number of computers or remote terminals at short distances at the degree of precincts, a system is known wherein transmission lines are connected among the respective devices. However, the number of the transmission lines becomes enormous, resulting in a considerably high cost and in an extremely complicated wiring network. In order to solve the problem, a system is considered in which a number of computers are coupled to a bus so as to carry out communication through the bus. With such system, however, when at least two of the computers transmit signals at the same time, the signals interfere with each other. This makes reception impossible, and does not fulfill the purpose of the communication. For this reason, a prior art arrangement couples a controlling station, which assigns communication periods of time to the respective computers so as to prevent their signals from being superposed. The branch circuit system adopted in data communication in the prior art arrangements is of such construction and operation, and is usually termed the poling system. However, when the control station is utilized as described above, the whole system becomes complicated. Additionally, since data of one of the devices cannot be transmitted before the assignment of the communication period of its own, it is disadvantageously difficult to promptly perform efficient data communication.

SUMMARY OF THE INVENTION

An object of the present invention is to provide a circuit arrangement by which, even when signals of two stations are superposed in the common bus, they can be transmitted and received without any mutual interference, and to provide a circuit arrangement by which, when signals of three or more stations are superposed, the superposition of the signals is detected without fail such that a request for re-transmission is enabled.

Another object of the present invention is to provide a circuit arrangement by which fail safeness is introduced into a coupling portion between each station and a bus, so that the transmission capability of the bus may be prevented from being damaged even if problems occur at one of the stations.

In accordance with the present invention, each station is constructed such that a signal obtained by subtracting a signal generated from a particular station from a signal on the bus serves as a signal to-be-received, so as to prevent a signal transmitted from another station from being masked by the signal of the particular station itself (since the signal of another station is attenuated by the line, that of the particular station is more intense) to make the reception impossible, or from being superposed on the signal of the particular station itself to make the discrimination impossible. Further, in order to render the communication system fail safe, the present invention is constructed such that, using a current transformer for at least the coupling between a signal transmitting circuit and the bus, the bus side is maintained in a normal condition even when the station side gives rise to such problems as a short-circuit and an opening of the circuit.

The other objects, features and advantages of the invention will be apparent from the following detailed description when read in conjunction with the accompanying drawings.

DESCRIPTION OF THE PREFERRED EMBODIMENTS

Figure 1:
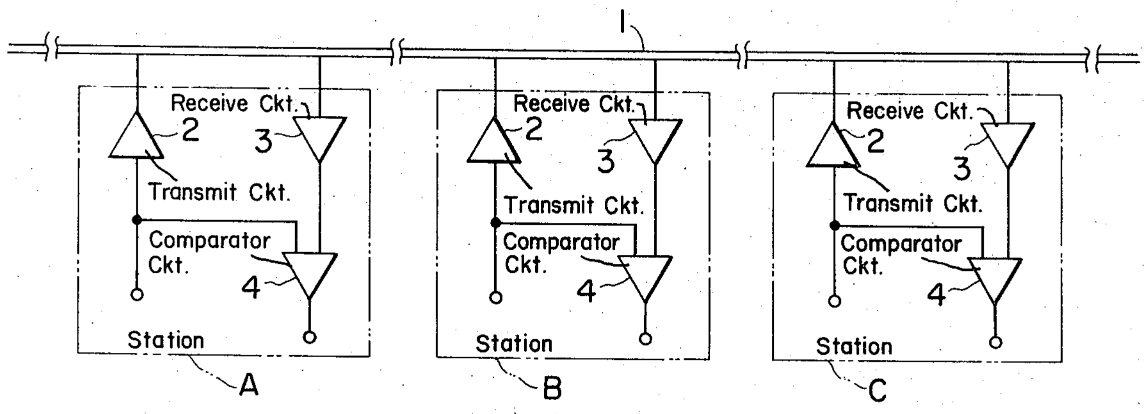
FIG. 1 is a block diagram for explaining the principle of the present invention.

FIG. 1 is a diagram which illustrates the principle of the present invention and includes a common bus 1 and for example three arbitrary stations A, B and C representing a portion of a number of stations connected to the common bus.

Reference numeral 2 represents a transmitting circuit of the station, 3 a receiving circuit thereof, and 4 a circuit thereof for comparing a transmitting signal and a receiving signal. Assuming now that two of the stations, e.g., the station A and the station B simultaneously generate signals in order to conduct mutual communication, a generating signal of the station A and a signal from the station B, both signals having been passed through the bus 1, appear at the output of the receiving circuit 3 of the station A. Herein, without the comparator 4, interference between the two signals will take place with the result that the signal of the station B cannot be correctly received. Since the stations A and B are generally some distance apart, the signal of the station B which reaches the receiving circuit 3 of the station A is smaller than the generating signal of the station A due to the attenuation by the line. Accordingly, in the case where the distance is large, the signal of the station B received at the station A is masked by the generating signal of the station A, and has its reception jammed. Moreover, since the simultaneous signal generation cannot be detected, countermeasures such as a request for re-transmission cannot be taken. The comparator 4 serves to eliminate the drawbacks. The output of the comparator 4 is that output of the receiving circuit 3 from which the generating signal output of the station A is subtracted, so that the signal of the station B is received and provided at the output. Thus, the correct reception is possible in spite of the presence of the generating signal of the station A itself. In actuality, there is a slight difference between the transmission characteristics of the path along which the generating signal of the station A proceeds from the transmitting circuit 2 through the line 1 to the receiving circuit 3 and the path along which the generating signal proceeds directly to the comparator 4, so that the component of the generating signal remains, to determine the limit of merit. Especially, when the characteristic of the line 1 varies from the normal state due to problems of another station or for any other reason, this has a great influence, and it is therefore required for the coupling between each station and the line that a circuit means is utilized by which the line characteristic is invariable whether the station is normal or abnormal.

In the above, description has been made of the detection without any interference between mutual signals in the case where the two stations A and B generate the signals at the same time. Description will now be made of apparatus for reliably determining the superposition of signals in the case where at least three stations generate the signals simultaneously. The description will be made with the stations A, B and C assumed to be the three stations and with the center at the station B. At the output of the comparator 4 of the station B, the signal of the station B does not appear, and only the signals of the stations A and C appear. The magnitudes of the signals of the stations A and C differ on account of their attenuation by the line in accordance with the distances between the respective stations and the station B. In some cases of the magnitudes, the signal of one of the stations is masked by that of the other station, or an interfering signal of both the stations is received. In any case, however, it is detected without fail in the station B that in addition to the signal generated by station B at least one of the stations A and C is also generating the signal at the same time. It is therefore possible to take countermeasures, such as a request for retransmission, in the station B.

Figure 2:
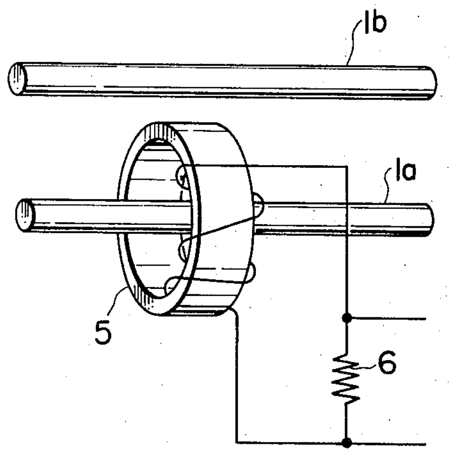
FIGS. 2 and 3 are schematic views showing a current transformer.
Figure 3:
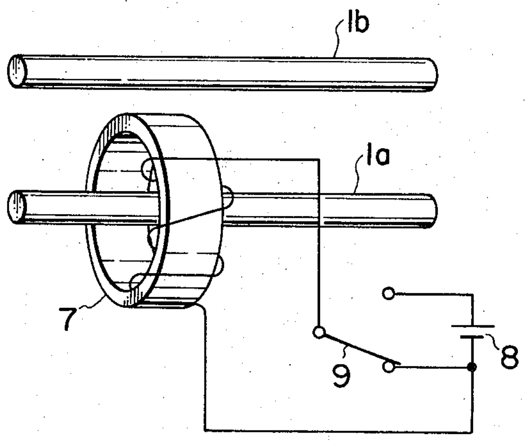

Referring now to FIGS. 2 and 3, there will be explained the principle of the operation of apparatus of the present invention for diminishing influence exerted on the line side by any problem at the station side, the provision of such apparatus being another object of the present invention. FIG. 2 is a view showing a construction for connecting the receiving circuit to the transmission line, while FIG. 3 is a view showing a construction for connecting the transmitting circuit to the transmission line. In FIG. 2, 1*a* and 1*b* designate the transmission lines, 5 a transformer whose primary side is the transmission line 1*a* and which has the receiving circuit connected on its secondary side, and 6 a load. The current transformer 5 obtains on the secondary side an output proportional to the line current of the primary side. Although the lines 1*a* and 1*b* are illustrated as a pair of lines, the transmission line may be formed by a coaxial line with line 1*a* the core of the coaxial line and line 1*b* the outer conductor.

In FIG. 3, numeral 7 indicates a current transformer similar to the current transformer in FIG. 2, and numerals 8 and 9 respectively represent a power source and a change-over switch for signal generation. Both the methods of connection illustrated in FIGS. 2 and 3 have a fail safe property. More specifically, if the secondary side is short-circuited due to problems at the station the characteristic of the line hardly changes. In the case of opening of the secondary side, the line side characteristic can also be held substantially invariable by designing an inductance at the opening of the secondary side to be small. Such feature cannot be attained if the primary side of the transformer is coupled in parallel or series with the line. The system shown in FIG. 1 can be made more reliable by the use of coupling circuits having this property.

Figure 4:
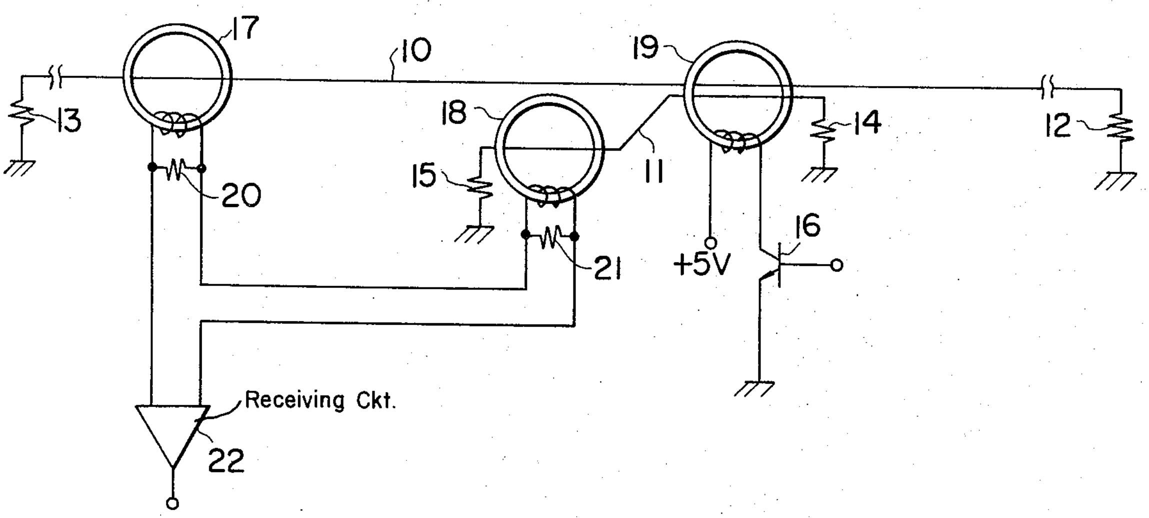
FIGS. 4, 5, 6 and 7 are schematic connection diagrams each showing an embodiment of the present invention.

The invention will be described hereunder in conjunction with several different embodiments, FIG. 4 shows an embodiment of the present invention wherein reference numeral 10 designates the core of a coaxial cable, whose outer conductor is omitted from the drawing. Reference numeral 11 indicates a simulated or dummy line which lies within a station. Shown at 12, 13, 14 and 15 are terminal resistances of the lines. Although a number of stations are connected to the coaxial line 10, only one of such stations is shown in the figure. Numerals 17 and 18 indicate current transformers of the construction illustrated in FIG. 2. That is, the coaxial line 10 is the primary side with the coaxial core line being passed through each doughnut-shaped ferrite core, and the secondary winding is provided on the magnetic core, with the secondary side being terminated with resistances 20 and 21. Shown at 19 is a current transformer of the construction in FIG. 3. It differs, however, in that, in addition to the coaxial line 10, the simulated line 11 is simultaneously incorporated on the primary side. The number of turns of the secondary windings of the current transformers 17 and 18 are large as, for example, 100 turns, whereas the number of turns of the secondary winding of the current transformer 19 is small as, for example, 5 turns. A signal from another station is received by the current transformer 17, and reaches a receiving circuit of this station 22. Although there is also a transmission path extending via the current transformer 19, the simulated line 11 and the current transformer 18, this path has a low gain and does not provide a suitable path for a signal from another station. Assuming that a transistor 16 is turned on and off for signal transmission to feed pulses from the transformer 19, the pulses are transmitted to the coaxial line 10, and reach the receiving circuit 22 via the transformer 17. On the other hand, the same pulses proceed from the simulated line 11 via the transformer 18 to the receiving circuit 22. Since the pulses of both transmission paths need be opposite in phase and equal in magnitude, similar transformers are used for the transformers 17 and 18 and similar resistances for the terminal line resistances 12 to 15. When the coaxial line 10 undergoes mismatching due to e.g., problems at another station, the gain of the path of the transformer 19 → coaxial line 10 → transformer 17 → the receiving circuit 22 changes, and the local signal appears at the output of the receiving circuit 22. In order to avoid influences of other stations, the current transformers 17 and 19 having the fail safe property are employed for the coupling between the coaxial line 10 and the station.

Figure 5:
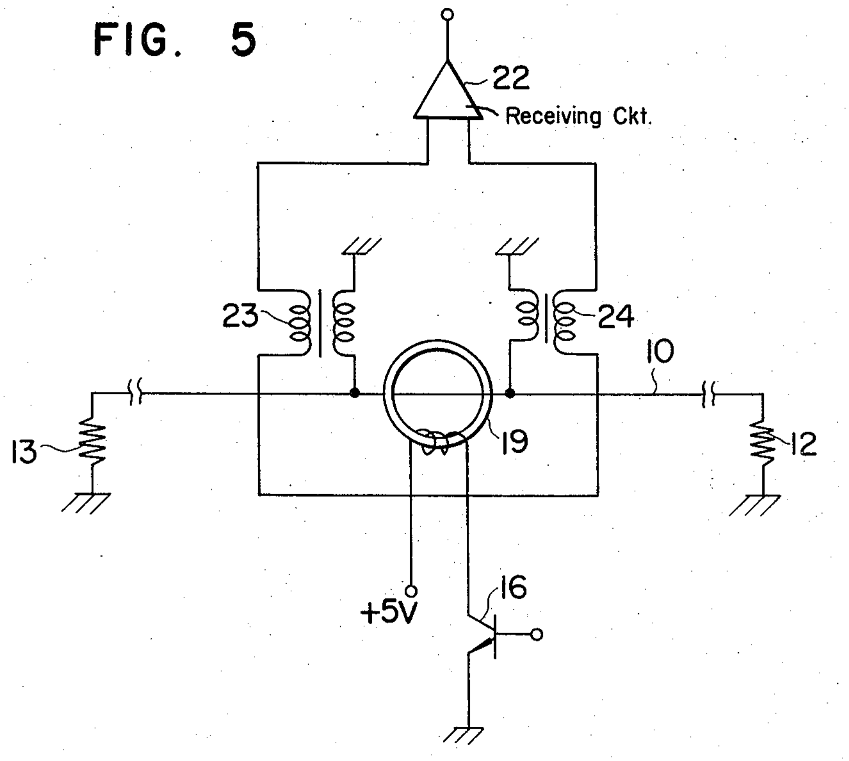

FIG. 5 shows another embodiment of the present invention which utilizes a hybrid coil-like coupling for the coupling between the coaxial line and the receiving circuit. Although a hybrid coil is not always fail safe, it attains satisfactory reliability by employing the above-mentioned current transformer on the transmitting side. Referring to the figure, numeral 19 designates a current transformer for transmission as in the embodiment in FIG. 4, and numerals 23 and 24 voltage transformers which are connected between the core 10 of a coaxial line and the outer conductor thereof, with the symbols affixed to the other parts being the same as in FIG. 4. A signal produced through the current transformer 19 by the on and off operations of the transistor 16 induces current in the coaxial line 10. However, when it is received by the voltage transformers 23 and 24, the primary voltages of both the voltage transformers (the line voltage) are opposite in phase to each other, and hence, they are cancelled at the input of the receiving circuit 22 and do not appear at the output thereof. On the other hand, the signal of another station transmitted along the coaxial line 10 acts cumulatively on the voltage transformers 23 and 24. At the output of the receiving circuit 22, therefore, double the output of each transformer appears as a signal. Although, in this embodiment the current transformer is fail safe, in the case of the short-circuiting of the voltage transformers 23 and 24, the line will be rendered inoperable. Additionally, an imperfect short-circuit will change the line impedance, which may influence the operation of another station. The likelihood of short-circuiting, however, resides in the transmitting circuit of low secondary impedance rather than in the receiving side. Since the receiving side can be made high in impedance, the embodiment can be made considerably fail safe by employing the current transformer at least on the transmitting side.

Figure 6:
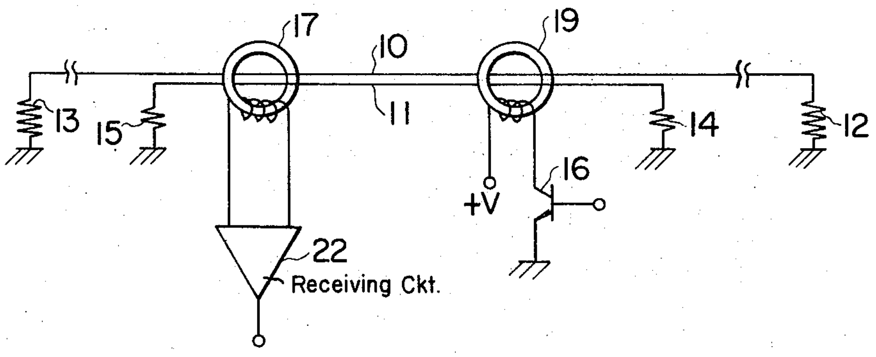

FIG. 6 shows still another embodiment of the present invention wherein the simulated line 11 in FIG. 4 is passed through the current transformers 17 and 19 in common, and the transformer 18 is dispensed with.

Figure 7:
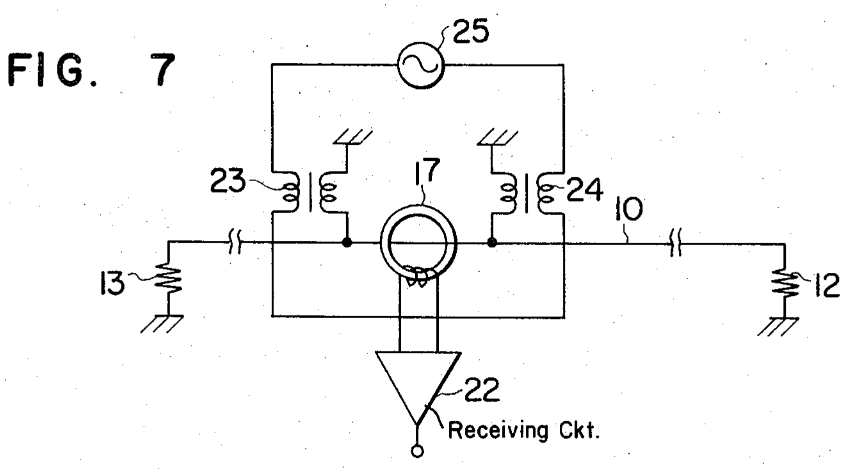

FIG. 7 shows a modification of the embodiment in FIG. 5 wherein the receiving circuit 22 and the transmitting source of FIG. 5 are replaced respectively by a transmitter source 25 and the receiving circuit 22.

It is readily understood that the function and effect as in the foregoing can also be attained by such circuit arrangements.

As described above, according to the present invention, even in case where, in a system in which the respective stations communicate through a bus, the signals of two of the stations are superposed on the bus, they can be transmitted and received without mutual interference. Furthermore, even when the signals of a least three of the stations are superposed on the bus, the simultaneous generation of the signals by the other stations is reliably detected without being hindered by the signal of the particular station itself, and thus, countermeasures such as a request for re-transmission can be taken. This effect also makes it possible to detect the state of the line by receiving a signal, which is the signal of the particular station itself as is reflected when and where the impedance mismatching of the line (attributable to, e.g., problems of the line) takes place. Moreover, owing to the use of the fail safe type coupling, even when another station connected to the bus has problems such as secondary side short-circuit and opening, the remaining stations can operate normally.

Obviously, many modifications and variations of the present invention are possible in the light of the above teachings. It should therefore be understood that within the scope of the appended claims, the invention may be practiced otherwise than as specifically described.

What we claim is:

1. In a system wherein a plurality of transmitting-and-receiving stations are connected to a bus for performing data communication among said stations through the common bus, each of said transmitting-and-receiving stations comprising signal transmitting means for transmitting data to said bus, first coupling means including a first magnetic core arrayed so that said bus penetrates substantially through the center thereof, and a first winding wound about said first core and having a signal from said signal transmitting means supplied thereto, signal receiving means for receiving data on said bus, second coupling means including a second magnetic core arrayed so that said bus penetrates substantially through the center thereof, and a second winding wound about said second core and providing an output signal to said signal receiving means, and a conductor line arranged so as to penetrate substantially through the centers of said first and second magnetic cores with both ends thereof being terminated with terminal impedance elements respectively.

2. In a system wherein a plurality of transmitting-and-receiving stations are connected to a bus for performing data communication among said stations through the common bus, each of said transmitting-and-receiving stations comprising signal transmitting means for transmitting data to said bus, signal receiving means for receiving data on said bus, first coupling means including a first magnetic core arrayed so that said bus penetrates substantially through the center thereof, and a first winding wound about said core and supplied with a signal from said signal transmitting means, and first and second transformers, each having a primary and secondary winding, with the primary windings interposed between ground and the portions of the bus located on both sides of the bus part penetrating through said first magnetic core, the outputs of the secondary windings of said transformers being differentially applied to said signal receiving means.

3. In a system wherein a plurality of transmitting-and-receiving stations are connected to bus for performing data communication among said stations through the common bus, each of said transmitting-and-receiving stations comprising signal transmitting means for transmitting data signals to said bus, first coupling means including a first magnetic core arrayed so that said bus penetrates substantially through the center thereof, and a first winding would about said first core and having a signal from said signal transmitting means supplied thereto, second coupling means including a second magnetic core arrayed so that said bus penetrates substantially through the center thereof, and a second winding which is wound around said second core, comparator circuit means including a third magnetic core, a third winding wound around said third core, and a conductor line penetrating substantially through the center of both the first and third magnetic cores with both ends thereof being terminated with terminal impedance elements respectively, and signal receiving means supplied with a signal of the difference between an output signal of said second winding and an output signal of said third winding.

4. In a system wherein a plurality of transmitting-and-receiving stations are connected to a bus for performing data communication among said stations through the common bus, each of said transmitting-and-receiving stations comprising signal transmitting means for transmitting data to said bus, signal receiving means for receiving data on said bus, first coupling means including a first magnetic core arrayed so that said bus penetrates substantially through the center thereof, and a first winding wound about said core and supplying an output signal to said signal receiving means, and first and second transformers having primary and secondary windings interposed between ground and the portions of the bus located on both sides of the bus part penetrating through said first magnetic core, and output from said signal transmitting device being applied to the primary windings of said transformers, the primary and secondary windings being connected so as to transmit equal output signals on both sides of said magnetic core.

* * * * *